United States Patent [19]

Harris et al.

[11] Patent Number: 5,244,926

[45] Date of Patent: Sep. 14, 1993

[54] PREPARATION OF ION EXCHANGE AND ADSORBENT COPOLYMERS

[75] Inventors: William I. Harris; Suresh Subramonian, both of Midland, Mich.

[73] Assignee: The Dow Chemical Company, Midland, Mich.

[21] Appl. No.: 899,393

[22] Filed: Jun. 16, 1992

[51] Int. Cl.[5] .................. C08F 212/08; C08F 212/06
[52] U.S. Cl. ........................................ 521/38; 521/25; 521/148; 526/294; 526/329.4; 526/333; 526/334; 526/335; 526/336; 526/340; 526/340.1; 526/340.3; 526/347; 526/348.2
[58] Field of Search .................. 521/38, 148; 526/347

[56] References Cited

U.S. PATENT DOCUMENTS

| | | |
|---|---|---|
| 2,932,629 | 4/1960 | Wiley . |
| 3,090,761 | 5/1963 | Backlund . |
| 3,329,409 | 8/1974 | Sommer et al. . |
| 3,390,207 | 6/1968 | Moss et al. . |
| 3,437,646 | 4/1969 | Scoggin . |
| 3,452,119 | 6/1969 | Hinton . |
| 3,465,065 | 9/1969 | Moss et al. . |
| 3,502,746 | 3/1970 | Miles . |
| 3,558,575 | 1/1971 | Keckler . |
| 3,669,947 | 6/1972 | Kahn et al. . |
| 3,803,079 | 4/1974 | Hokama . |
| 3,812,088 | 5/1974 | Bennett . |
| 3,935,148 | 1/1976 | Childers ............................ 523/343 |
| 3,970,611 | 7/1976 | Jezl et al. . |
| 4,016,347 | 4/1977 | Sommer et al. . |
| 4,224,415 | 9/1980 | Meitzner ............................ 521/38 |
| 4,239,669 | 12/1980 | Scott ............................ 260/29.6 R |
| 4,331,792 | 5/1982 | Goretta et al. . |
| 4,335,237 | 6/1982 | Ballweber . |
| 4,419,245 | 12/1983 | Barrett ............................ 521/28 |
| 4,501,866 | 2/1985 | Roggeman et al. . |
| 4,530,979 | 7/1985 | Birch . |
| 4,564,644 | 1/1986 | Harris . |
| 4,764,572 | 8/1988 | Bean, Jr. . |
| 4,950,332 | 8/1990 | Stringfield et al. . |

FOREIGN PATENT DOCUMENTS

| | | |
|---|---|---|
| 0062088 | 10/1982 | European Pat. Off. . |
| 0168622 | 1/1986 | European Pat. Off. . |
| 54-080388 | 6/1979 | Japan . |
| 60-233111 | 11/1985 | Japan . |
| 2-086603 | 3/1990 | Japan . |
| 87014 | 5/1985 | Romania . |
| 556486 | 7/1987 | Spain . |
| 1151480 | 5/1969 | United Kingdom . |
| 1261427 | 1/1972 | United Kingdom . |
| 1337084 | 11/1973 | United Kingdom . |

OTHER PUBLICATIONS

Kurenkov et al., "Adiabatic Polymerization of Acrylamide in Aqueous Solutions in the Presence of Hydrolyzing Agent," Eur. Polym. J. 26(8), pp. 915-918 (1990).
Baiburdov et al., "Kinetics of Copolymerization of Acrylamide With 2-Methylacryloxyethyltrimethylammonium Methyl Sulfate Under Adiabatic Conditions," Izv. Vyssh. Uchebn. Zaved., Khim. Khim. Teknol. 31(10) pp. 105-108 (1988).
Bune et al., "Polymerization of Acrylamide in Concentrated Aqueous Solutions in the Presence of the Borax-sodium Hydroxide System," Plast. Massy (9), pp. 11-14 (1987).
Kurenkov et al., "Adiabatic Polymerization of Acrylamide in Aqueous Solutions Initiated With the Potassium Persulfate-sodium Metabisulfite System," Vysokomol. Soedin., Ser. A29(2) pp. 348-351 (1987).
Kurenkov et al., "Adiabatic Polymerization of Acrylamide in Water in the Presence of a Potassium Persulfate-sodium Metabisulfite-copper Sulfate Initiating System," Zh. Prikl. Khim. 69(10), pp. 2311-2316 (1987).

Primary Examiner—Joseph L. Schofer
Assistant Examiner—Fred Zitomer

[57] ABSTRACT

A process for preparing crosslinked copolymer beads suitable for making polymeric adsorbents and ion-exchange resins comprising the substantially adiabatic suspension copolymerization of at least one monoethylenically unsaturated monomer with at least one polyethylenically unsaturated monomer in the presence of an effective amount of free-radical polymerization initiators.

15 Claims, No Drawings

PREPARATION OF ION EXCHANGE AND ADSORBENT COPOLYMERS

BACKGROUND OF THE INVENTION

Ion-exchange resins are used by industry to separate chemical species from solutions containing them. Such resins are prepared by substituting various functional groups onto a copolymer bead matrix. The functional groups are capable of associating with the impurities so as to remove them from solution. Ion-exchange resins may be cation-, anion-, or chelate-exchange resins, depending on the choice of functional group substituted onto the copolymer bead matrix. The copolymer bead matrix may also be used in preparing polymeric adsorbents, such as those disclosed in U.S. Pat. No. 4,950,332.

The copolymer bead matrix is typically prepared by suspension polymerization of a finely divided organic phase comprising monovinylidene monomers like styrene, polyvinylidene monomers such as divinylbenzene, a free-radical initiator, and, optionally diluents which are either phase-separating or soluble. The copolymer beads produced may be microporous, i.e., gellular in character, or macroporous, the result depending upon whether the phase-separating diluent is employed. The term "macroporous" as commonly used in the art means that the copolymer has both macropores and mesopores. The terms "microporous", "gel", and "macroporous" are well known in the art and generally describe the nature of the copolymer bead porosity. Microporous or gel copolymer beads have pore sizes on the order of less than about 20 Angstroms (Å), while macroporous copolymer beads have both mesopores of from about 20 Å to about 500 Å and macropores of greater than about 500 Å. Gel and macroporous copolymer beads, as well as their preparation, are further discussed in U.S. Pat. No. 4,256,840.

Recently, industry has focused on methods of preparing copolymer beads in multi-staged polymerizations, also known as seeded polymerization processes. Such copolymer beads are desirable due to good mechanical strength and osmotic shock resistance. Seeded polymerization processes can also prepare beads of relatively uniform size if the seed particles employed have similar size uniformity. U.S. Pat. Nos. 4,419,245 and 4,564,644 disclose processes wherein seed particles are suspended in a continuous medium and, thereafter, the seed particles are imbibed and polymerized with additional monomer to form copolymer beads. British Patent 1,151,480 discloses a process wherein copolymer beads are prepared from porous seed particles. European Patent Application No. 0 062 088 (Oct. 13, 1982) discloses preparation of gel or macroporous copolymer beads by a seeded polymerization process and European Patent Application No. 0 168 622 (Jan. 22, 1986) concerns preparation of macroporous copolymer beads by a seeded polymerization process using macroporous seed particles.

Crosslinked copolymers for ion exchange and absorbent resins are conventionally prepared by suspension polymerization with one to three isothermal stages wherein the heat generated by the polymerization exotherm is removed to maintain the isothermal conditions. The prior art conventional technology requires a long cycle time of 10–20 hours per batch and generates high polymer waste, especially with low crosslink recipes. In addition, reactors require excess heat removal capacity to maintain the isothermal conditions.

U.S. Pat. No. 4,239,669 teaches the emulsion polymerization of vinyl aromatic monomer and conjugated diene under adiabatic conditions in a continuous flow agitated reactor. The phase ratio is held low to hold the temperature to 80°–100° C. The emulsion particle size is 1000–1500 angstroms. This patent does not refer to the preparation of a suspension bead product and the particles produced are not hard crosslinked bead polymer used in the production of ion exchange resins.

SUMMARY OF THE INVENTION

This invention comprises preparing ion exchange copolymers by polymerizing the monomer phase in the presence of the aqueous phase under substantially adiabatic conditions. A substantial amount of the heat of polymerization is not removed but is used to raise the temperature of the reactor contents. Reaction kinetics are substantially accelerated resulting in a very short polymerization time at the final adiabatic temperature, resulting in better reactor utilization and increased product throughput. In addition, less reactor waste is generated leading to cleaner reactors and less downtime.

DETAILED DESCRIPTION OF THE INVENTION

The present invention provides a process for making crosslinked copolymer beads suitable for polymeric adsorbents and ion-exchange resins, the process comprising;

(a) providing a suspension of a monomer mixture within a continuous suspending medium, the monomer mixture comprising at least one monoethylenically unsaturated monomer, at least one polyethylenically unsaturated monomer, and an effective amount of free-radical polymerization initiator;

(b) maintaining the suspension under conditions sufficient to polymerize the monomer mixture and obtain copolymer beads, the conditions including retention within the suspension of a substantial amount of exothermic heat evolved during polymerization of the monomers to copolymer, the retention of the exothermic heat resulting in a rise in temperature of the suspension to at least 120° C. for a time sufficient to polymerize to substantially complete conversion; and (c) recovering the copolymer beads from the suspension.

Polyethylenically unsaturated monomers useful in the present invention include, for example, divinylbenzene, ethylene glycol diacrylate and ethylene glycol dimethacrylate. Such monomers are advantageously present in an amount of from about 0.04 to about 80 weight percent based on total weight of the monomer mixture. Monoethylenically unsaturated monomers include, for example, styrene, paravinyltoluene, vinyltoluene, vinylbenzyl chloride and ethylvinylbenzene. Such monomers are advantageously present in an amount of from about 20 to about 99.96 weight percent based on the total weight of the monomer mixture. With aromatic and acrylate monomers the conversion is preferably in excess of 97 weight percent.

The free-radical initiator employed is advantageously selected from peroxides, peroxyesters and azo compounds such as, for example, benzoyl peroxide, t-butyl peroctoate and t-butyl perbenzoate. The initiator is advantageously employed in an effective amount of from at least about 0.05 weight percent to about 2.0 weight percent based on the weight of the monomers.

The monomers can be added to the suspending medium in an inert diluent such as, for example, isooctane, amyl alcohol, t-butyl alcohol, sec. butyl alcohol and toluene. The suspending medium is preferably water containing suspending agents such as, for example, gelatins, carboxymethyl methylcellulose, polyvinyl alcohols, inorganic stabilizers such as tricalcium phosphate, bentonite clays and zinc hydroxides. The monomers can be imbibed into a seed polymer or a portion of the monomer can be added intermittently or continuously as the polymerization proceeds. For seeded recipes surfactants such as sodium lauryl sulfate are advantageously employed. The suspension is advantageously maintained at an initial temperature of at least 40° C., preferably at least 70° C. by applying heat from an external source until the exothermic heat evolved from polymerization of the monomers to copolymer is sufficient to at least maintain the polymerization without further addition of heat to the suspension. During the reaction the temperature of the suspension advantageously reaches at least about 120° C. and preferably at least about 130° C. for a time sufficient to polymerize at least about 90 weight percent (preferably at least 99.5 weight percent) of the polymerizable monomer.

Some moderate lowering of the final temperature may be achieved by employing polymerization moderators, such as, for example, alpha methyl styrene and by partial removal of heat through the jacket of the reactor, thereby increasing the phase ratio of the reaction mixture. The sensible heat of feed streams into the reactor can also be advantageously used to moderate the final temperature and thus the phase ratio.

The invention is further illustrated by the following example in which the quantities are given in parts by weight unless otherwise indicated.

EXAMPLE 1

Batch polymerizations were conducted in a 1-gallon stainless steel jacketed reactor equipped with agitation. The monomer phase comprised 683.6 g styrene, 116.4 g divinylbenzene-55, 8 g 50 percent tert-butyl peroctoate and 0.4 g tert-butyl perbenzoate. The aqueous phase comprised 1276 g water, 320 g 1 percent carboxy methyl methyl cellulose (suspending agent) and 4 g 60 percent sodium dichromate (latex polymerization inhibitor). The weight phase ratio (monomer:aqueous) was 1:2. Both phases were loaded into the reactor, which was then sealed and pressure tested. The reactor was purged with nitrogen and the agitation rpm was set. The reactor temperature was ramped to 80° C. to initiate the monomer charge and heated as fast as possible, about one-half hour, to the final adiabatic temperature (130° C.) to simulate the self-heat ramp. The reactor was held at that temperature for 1 hour and then cooled. The copolymer was unloaded, washed, filtered, dried, and sieved. The copolymer of Example 1 was functionalized by sulfonating the beads with an excess of 99 percent sulfuric acid utilizing methylene chloride as the swelling solvent. The sulfonated beads were hydrated with increasingly diluted sulfuric acid and then backwashed with deionized water to form a strong acid gel cation exchange resin.

The final properties of the resin obtained were:
Whole Perfect Beads (WPB)=99%
Water Retention Capacity=50.4%
Dry Weight Capacity=5.2 meq/g
Wet Volume Capacity=2.0 meq/ml
Crush Strength=1290 g/bead
Osmotic Shock Resistance=90% WPB*

*The percentage of whole perfect beads after 25 cycles of successive washes as follows: 1) 10 percent sodium hydroxide, 2) water, 3) 10 percent sulfuric acid, and 4) water.

The final resin properties from the adiabatic polymerization are comparable or superior to those of resins produced conventionally.

Water retention capacity is determined by swelling a weighed amount of resin with water, removing excess water and weighing the fully swollen resin. The resin is then dried on a moisture balance until a constant weight is obtained. Water retention capacity is the ratio of water imbibed to the total combined weight of the resin plus imbibed water.

Dry weight capacity, weak-base capacity, salt-splitting capacity and wet volume capacity are determined by standard analytical techniques. Crush strength is determined by taking a statistically representative sample of at least about 30 beads from a given sample of resin or copolymer beads, and determining the force, in grams, needed to fracture each bead using a Chatillon Scale, Model DPP-1KG available from J. Chatillon & Sons Company. Crush resistance is reported as the average of the force measurements obtained for the 30 beads.

EXAMPLE 2

The procedure of Example 1 was repeated except that the initiator employed was 5.6 g benzoyl peroxide. The weight phase ratio (monomer:aqueous) was 1:2.

The final properties of the strong acid gel cation exchange resin obtained were:
Whole Perfect Beads (WPB)=99%
Water Retention Capacity=50.8%
Dry Weight Capacity=5.3 meq/g
Wet Volume Capacity=1.9 meq/ml
Crush Strength=1840 g/bead
Osmotic Shock Resistance=97% WPB

EXAMPLE 3

Using the same procedure set forth in Example 1, another batch polymerization was conducted to synthesize a gel copolymer. The monomer phase comprised 779.8 g styrene, 19.9 g divinylbenzene-55, and 10.9 g benzoyl peroxide. The aqueous phase comprised 1313 g water, 287 g 1 percent carboxymethylmethyl cellulose, 2.5 g 60 percent sodium dichromate. The weight phase ratio (monomer:aqueous) was 1:2. The copolymer of Example 3 was functionalized by chloromethylating the beads with an excess of chloromethylmethyl ether in the presence of ferric chloride catalyst. The excess ether was destroyed with three methanol washes. The chloromethylated beads were then swollen in methylal and reacted with trimethylamine to form a strong base gel anion exchange resin. The final anion resin properties were:
Whole Perfect Beads (WPB)=99%
Water Retention Capacity=76.7%
Dry Weight Capacity=4.3 meq/g
Wet Volume Capacity=0.65 meg/ml

EXAMPLE 4

Following the procedure of Example 1, another batch polymerization was conducted to synthesize a macroporous copolymer. The monomer phase comprised 506 g styrene, 208 g divinylbenzene-55, 284 g iso-octane, 3.6 g 50 percent t-butyl peroctoate and 1.2 g t-butyl perbenzoate. The aqueous phase comprised 1182 g water, 314 g 1 percent carboxymethylmethyl cellulose and 3.2 g 60 percent sodium dichromate. The weight phase ratio (organic:aqueous) was 2:3. The copolymer beads were washed and then steam distilled to remove the iso-octane, and dried before functionalization. The copolymer of Example 4 was functionalized by sulfonating the beads with an excess of 99 percent sulfuric acid. The sulfonated beads were hydrated with increasingly diluted sulfuric acid and then backwashed with deionized water to form a strong acid macroporous cation exchange resin. The final cation resin properties were:

Whole Perfect Beads (WPB)=99%
Water Retention Capacity=47.0% (Na+)
Wet Volume Capacity=2.1 meq/ml (Na+)

EXAMPLE 5

Following the procedure of Example 4, another batch polymerization was conducted to synthesize a macroporous copolymer. The monomer phase comprised 692.4 g styrene, 107.6 g divinylbenzene-55, 490 g iso-octane, 7.2 g 50 percent t-butyl peroctoate and 4.8 g t-butyl perbenzoate. The aqueous phase comprised 1005 g water, 271 g 1 percent carboxymethylmethyl cellulose and 2.7 g 60 percent sodium dichromate. The weight phase ratio (organic:aqueous) was 1:1. The copolymer of Example 5 was functionalized by chloromethylating the beads with an excess of chloromethylmethyl ether in the presence of ferric chloride catalyst. The chloromethylated beads were washed with methanol three times and then reacted with dimethylamine to form a weak base macroporous anion exchange resin. The final anion resin properties were:

Whole Perfect Beads (WPB)=99%
Water Retention Capacity=43.3%
Dry Weight Capacity=5.5 meq/g
Wet Volume Capacity=2.0 meq/ml
Weak Base Capacity=1.8 meq/ml
Salt Splitting Capacity=0.2 meq/ml

EXAMPLE 6

Batch polymerizations were conducted in a 30-gallon stainless steel jacketed reactor equipped with agitation. The organic phase comprised 24.6 kg styrene, 5.1 kg divinylbenzene-55, 64.6 g 50 percent tert-butyl peroctoate and 14.4 g tert-butyl perbenzoate. The aqueous phase comprised 46.4 kg water, 19.1 kg 0.5 percent carboxymethylmethyl cellulose (suspending agent), 163.8 g 60 percent sodium dichromate (latex inhibitor). The mass phase ratio (monomer:aqueous) was 0.45. The reactor was heated from room temperature to 80° C. to initiate the monomer charge and allowed to self heat thereafter to the final adiabatic temperature (130° C.). The reactor was held at that temperature for 1 hour and then cooled. The copolymer was unloaded, washed, filtered, dried, sieved, and then sulfonated as in Example 1 to form a strong acid gel cation exchange resin. The final cation resin properties were:

Whole Perfect Beads (WPB)=99%
Water Retention Capacity=47.9%
Wet Volume Capacity=2.2 meq/ml
Dry Weight Capacity=5.3 meq/g
Crush Strength=1480 g/bead
Osmotic Shock Resistance=96%

The final resin properties with the adiabatic polymerization are comparable or superior to that of resins produced conventionally.

Various modifications may be made in the present invention without departing from the spirit or scope thereof as will be readily apparent to those skilled in the art.

What is claimed is:

1. A process for making crosslinked copolymer beads suitable for making polymeric adsorbents and ion-exchange resins, the process comprising:
   (a) providing a suspension of a monomer mixture within a continuous suspending medium, the monomer mixture comprising at least one monoethylenically unsaturated monomer selected from the group consisting of styrene, vinyl toluene, paravinyl toluene, vinylbenzyl chloride and ethylvinylbenzene, at least one polyethylenically unsaturated monomer selected from the group consisting of divinylbenzene, ethylene glycol diacrylate, ethylene glycol dimethacrylate and mixtures thereof, and an effective amount of free-radical polymerization initiator;
   (b) maintaining the suspension under conditions sufficient to polymerize the monomer mixture and obtain copolymer beads, the conditions including retention within the suspension of a substantial amount of exothermic heat evolved during polymerization of the monomers to copolymer, the retention of the exothermic heat resulting in a rise in temperature of the suspension to at least about 120° C. for a time sufficient to polymerize to substantially complete conversion; and
   (c) recovering the copolymer beads from the suspension.

2. The process of claim 1 wherein the suspension reaches a temperature of at least 130° C.

3. The process of claim 1 wherein the suspension is at a temperature of at least about 120° C. for a time sufficient to polymerize at least about 90 weight percent of the polymerizable monomer based on total weight of the monomer in the mixture.

4. The process of claim 1 wherein the time at which the suspension is at a temperature of at least about 120° C. is about two hours or less.

5. The process of claim 1 wherein the conditions include maintaining the suspension at an initial temperature of at least about 40° C. by applying heat from an external source until the exothermic heat evolved from polymerization of the monomer to copolymer is sufficient to at least maintain the polymerization without addition of heat to the suspension.

6. The process of claim 5 wherein the initial temperature is at least about 70° C.

7. The process claim 1 wherein the suspending medium is water.

8. The process of claim 1 wherein the monoethylenically unsaturated monomer is present in an amount of from about 20 to about 99.96 weight percent based on total weight of the monomer mixture.

9. The process of claim 1 wherein the polyethylenically unsaturated monomer is present in an amount from about 0.4 to about 80 weight percent based on total weight of the monomer mixture.

10. The process of claim 1 wherein the free-radical initiator is selected from peroxide, peroxyesters, azo compounds, and mixtures thereof.

11. The process of claim 10 wherein the free-radical initiator is benzoyl peroxide, t-butyl peroctoate, t-butyl perbenzoate, and mixtures thereof.

12. The process of claim 1 wherein the effective amount of the free-radical initiator is from about 0.05 to about 2.0 weight percent based on total weight of the monomer mixture.

13. The process of claim 1 wherein the monomer mixture comprising inert diluent is added to the suspending medium.

14. The process of claim 1 wherein the monomer is imbibed into a seed polymer.

15. The process of claim 1 wherein a portion of the monomer is added to the polymerization as it proceeds.

* * * * *